UNITED STATES PATENT OFFICE.

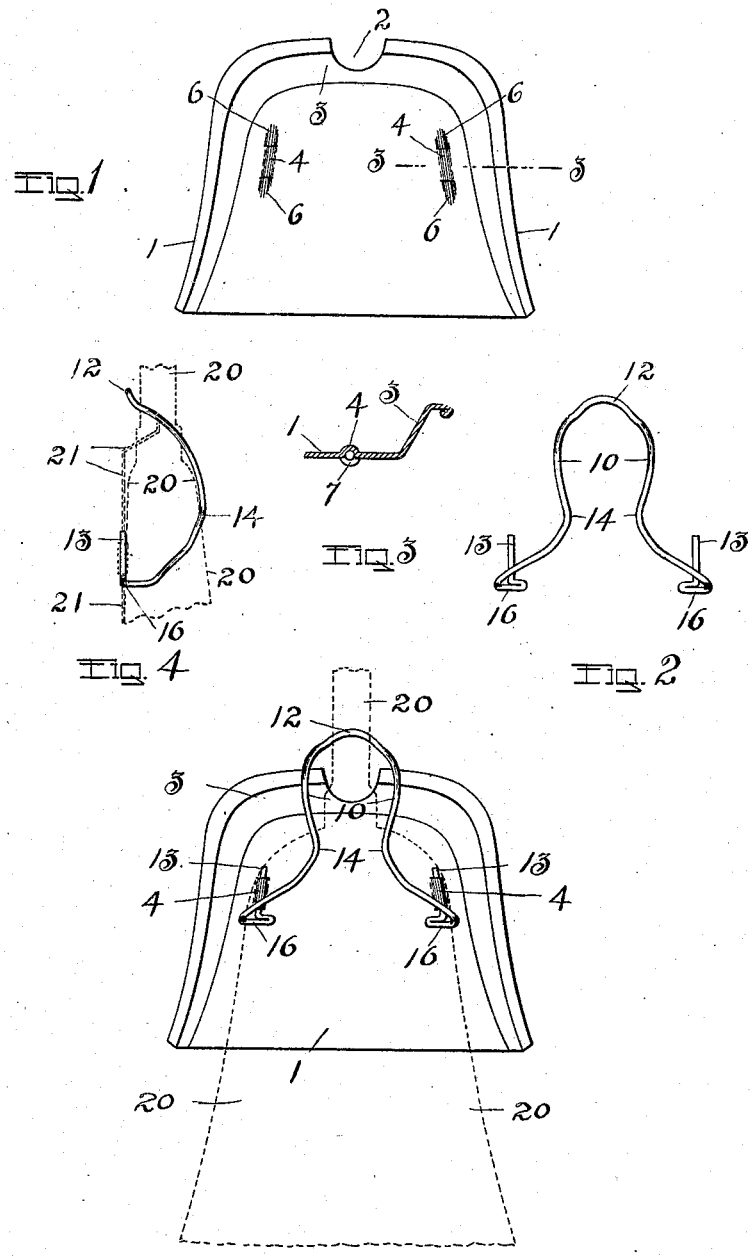

CHARLES W. GROBE, OF TROY, NEW YORK.

DUST-PAN ATTACHMENT.

No. 924,059.  Specification of Letters Patent.  Patented June 8, 1909.

Application filed January 2, 1909. Serial No. 470,371.

*To all whom it may concern:*

Be it known that I, CHARLES W. GROBE, a citizen of the United States, residing at Troy, county of Rensselaer, and State of New York, have invented certain new and useful Improvements in Dust-Pan Attachments, of which the following is a specification.

The invention relates to such improvements and consists of the novel construction and combination of parts hereinafter described and subsequently claimed.

Reference may be had to the accompanying drawings, and the reference characters marked thereon, which form a part of this specification. Similar characters refer to similar parts in the several figures therein.

The principal objects of the invention are to provide the body part of a dust-pan with a detachable handle which can be easily and quickly secured to the pan by the user, thereby permitting a quantity of pan-bodies to be closely packed together, when the handles are detached, for the purpose of convenience in shipping, and the handles afterward readily attached by any unskilled person; and to provide a handle which will not only be convenient in using the pan, but will also afford a convenient means for securing the pan upon a broom so that the broom and pan can be kept together while not in use, and the pan supported by the broom when hung up in the usual manner.

The invention consists of means for conveniently securing a wire handle to a dust-pan body in such a manner that the handle can be easily and quickly attached or detached; also of a pan-body having an open recess in its back, adapted to receive a broom handle, and a wire handle having spring-arms attached to the pan-body in such a manner that a broom may be inserted between the arms and the body of the pan, and the pan supported thereon by the broom, as will hereinafter be more fully described and subsequently pointed out in the claims.

Figure 1 of the drawings is a plan-view of the pan-body with the handle detached. Fig. 2 is a similar plan-view of the handle detached. Fig. 3 is a vertical cross-section of a part of the pan-body, taken on the broken line 3—3 in Fig. 1. Fig. 4 is a side view of the handle shown in Fig. 2, the relative position of the pan-body, when the handle is attached thereon, being shown by dotted lines, and the relative position of a broom secured between the handle and pan-body is also indicated by dotted lines. Fig. 5 is a plan-view of the dust-pan complete, showing the relative position of a broom inserted between the handle and pan-body for the purpose of supporting the pan upon the broom.

The pan-body, 1, is made in the usual form of such bodies, except that it is provided with an open recess, 2, in the upright wall, 3, at the back of the pan, adapted to receive the handle of a broom, and provided with the sockets, 4, which are shown integral with the pan-body. The sockets are formed by slitting the body of the pan transversely of the sockets at each end of the raised portion of the sockets, which are raised above the level of the pan-body, the neighboring portions of such body being depressed in line with the raised portions, as shown by the shaded lines 6 in Fig. 1, and in cross-section by the part marked 7.

The handle is preferably made of an integral piece of wire bent, as shown in Fig. 2, to form the grasp at 10, the yoke, 12, at the rear end of the handle, and the terminals, 13, adapted to be inserted in sockets 4, as seen in Fig. 5. The bends, 14, also serve as springs to engage the broom, shown by dotted lines in Fig. 5, and by dotted lines, 20, in Fig. 4. The transverse bends, 16, serve to prevent the terminals 13 from partaking of a rotatory movement in the pan-sockets, thereby making a stiff and rigid connection between the wire handle and the pan.

It will be observed that the handle-sockets, 4, converge toward each other in the direction of the back of the pan, and the terminals 13 of the handle are normally parallel to each other when the handle is detached, as seen in Fig. 2. Such an arrangement of the sockets and terminals makes it necessary to spring the arms of the handles slightly to enter the terminals in the sockets, and when the handle is attached to the pan-body, as seen in Fig. 5, the terminals necessarily converge in the same manner that the sockets do, thus causing a torsional force to be exerted upon the terminals to cause them to bind, with considerable force, upon the socket-walls, thereby not only increasing the rigidity of the wire handle, but also preventing accidental detachment of the handle from the pan-body while in use.

To secure the pan upon a broom it is only necessary to insert the end of the broom-handle from the front portion of the pan between the pan-body and the resilient bends, 14, to force the same rearwardly along the slot 2 and above the bend 12, to the position shown by dotted lines in Fig. 5 and the dotted lines 20 in Fig. 4, the dotted line 21 indicating the position of the pan-body. When in such position, the bends 14 exert considerable pressure upon the broom, and the pan is securely held in position upon the broom, and may be allowed to remain in this position while the broom is in use, in which position the front portion of the pan-body will bear upon one side of the broom with sufficient force to stiffen the head of the broom while in use, and materially aid in the effective use of the broom. When the broom and pan are thus secured, one to the other, both articles can be hung upon a nail or other suitable support while out of use by means of the yoke, 12, of the handle, which can be easily and quickly adjusted to such support.

With this improved device, both the broom and the pan can be hung up upon a single nail or other support as easily and quickly as the broom could be placed in a corner of a room, with the head of the broom resting on the floor. It is well known that a broom is injured by being allowed to stand in this manner upon the floor, and a string loop is sometimes secured to the upper end of the handle, by which it can be hung upon a nail, but the difficulty of affixing the loop to the nail generally prevents its use, and the broom is allowed to stand upon the floor.

What I claim as new and desire to secure by Letters Patent is—

1. The combination with the body-part of a dust-pan having oppositely disposed converging sockets; of a detachable handle made of wire bent to form a grasp-portion having terminals normally parallel to each other, and adapted, respectively, to be inserted in such sockets and engage the socket-walls under torsional pressure.

2. The combination with the body-part of a dust-pan having oppositely disposed sockets converging rearwardly of the pan; of a detachable handle made of wire bent to form rearwardly projecting terminals normally parallel to each other and adapted, respectively, to be inserted in such sockets and engage the socket-walls under torsional pressure.

3. The combination with the body-part of a dust-pan having oppositely disposed sockets midway of its front and back: of a detachable handle made of wire bent to form a grasp-portion adapted to overlie the rear half of the pan-body in an approximately horizontal plane, a supporting loop on the rear end of the grasp projecting rearwardly of, and below, the upper edge of the back of the pan and attaching terminals on the front end of the handle adapted to be inserted in the oppositely disposed sockets and support the several parts of the handle in the positions named.

4. The combination with the body-part of a dust-pan having oppositely disposed sockets therein: of a detachable wire handle bent to form yielding clamping arms, with attaching terminals adapted to be inserted in such sockets in such a manner that the clamping arms are supported above the pan-body in position to bear upon a broom inserted between the pan-body and such arms.

5. The combination with the body-part of a dust-pan having a recess in the upright wall at the back of the pan, opening upwardly and adapted to receive a broom-handle; of a wire handle bent to form yielding clamping arms; and means for securing the wire handle to the pan in such a manner that the clamping arms of the handle are supported above the pan-body in position to bear upon a broom when inserted between the pan-body and such arms.

6. The combination with the body-part of a dust-pan having a recess in the upright wall at the back of the pan, opening upwardly and adapted to receive a broom-handle; of a wire handle bent to form yielding clamping arms adapted to support a broom between such arms and the body-part of the pan, with the broom-handle resting in the recess, the yoke which connects the arms projecting rearwardly of and beneath such recess; and means for positioning and securing the wire handle on the pan.

In testimony whereof, I have hereunto set my hand this 31st day of Dec. 1908.

CHARLES W. GROBE.

Witnesses:
GEO. A. MOSHER,
J. DONSBACH.